US012320491B2

(12) United States Patent
Hanna et al.

(10) Patent No.: US 12,320,491 B2
(45) Date of Patent: Jun. 3, 2025

(54) BI-DIRECTIONAL LAMP

(71) Applicant: Pure Forms, LLC, San Antonio, TX (US)

(72) Inventors: Marcus Hanna, Beverly, MA (US); Jordan Tryon, Woburn, MA (US); Hannah Polster, Beverly, MA (US); John Fiegener, Marblehead, MA (US); Ben Mathews, San Antonio, TX (US)

(73) Assignee: Pure Forms, LLC, San Antonio, TX (US)

( * ) Notice: Subject to any disclaimer, the term of this patent is extended or adjusted under 35 U.S.C. 154(b) by 0 days.

(21) Appl. No.: 18/151,026

(22) Filed: Jan. 6, 2023

(65) Prior Publication Data

US 2023/0228390 A1 Jul. 20, 2023

Related U.S. Application Data

(60) Provisional application No. 63/298,089, filed on Jan. 10, 2022.

(51) Int. Cl.

| | |
|---|---|
| ***F21S 6/00*** | (2006.01) |
| ***F21S 10/02*** | (2006.01) |
| ***F21V 21/116*** | (2006.01) |
| ***F21V 21/26*** | (2006.01) |
| ***F21V 21/29*** | (2006.01) |
| ***F21V 21/30*** | (2006.01) |
| *F21Y 115/10* | (2016.01) |

(52) U.S. Cl.

CPC ............... *F21S 6/003* (2013.01); *F21S 10/02* (2013.01); *F21V 21/116* (2013.01); *F21V 21/26* (2013.01); *F21V 21/29* (2013.01); *F21V 21/30* (2013.01); *F21Y 2115/10* (2016.08)

(58) Field of Classification Search

CPC ........ F21S 6/003; F21S 10/02; F21Y 2115/10

See application file for complete search history.

(56) References Cited

U.S. PATENT DOCUMENTS

| | | | | |
|---|---|---|---|---|
| 2011/0051437 A1* | 3/2011 | Ng | .......................... | F21S 6/003 362/418 |
| 2012/0286699 A1* | 11/2012 | Yan | .......................... | F21K 9/64 315/294 |
| 2017/0299165 A1* | 10/2017 | Shoulders | .............. | F21L 4/027 |

FOREIGN PATENT DOCUMENTS

| | | | | |
|---|---|---|---|---|
| CN | 203099368 U | * | 7/2013 | |
| CN | 103672550 A | * | 3/2014 | |
| CN | 205535233 U | * | 8/2016 | |
| DE | 19941987 A1 | * | 3/2001 | ............. F21L 4/025 |

* cited by examiner

*Primary Examiner* — Elmito Breval

(74) *Attorney, Agent, or Firm* — Jackson Walker L.L.P.

(57) ABSTRACT

A lamp with bi-directional light is provided. The lamp includes a body and a head. The head includes a first light source and a second light source. The first light source and the second light source are configured to provide light in directions perpendicular from each other.

10 Claims, 7 Drawing Sheets

BI-DIRECTIONAL LAMP

TECHNICAL FIELD

The present invention relates to lamps, such as desk lamps and table lamps.

BACKGROUND

There is a general desire for desk lamps and table lamps that provide multiple functions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
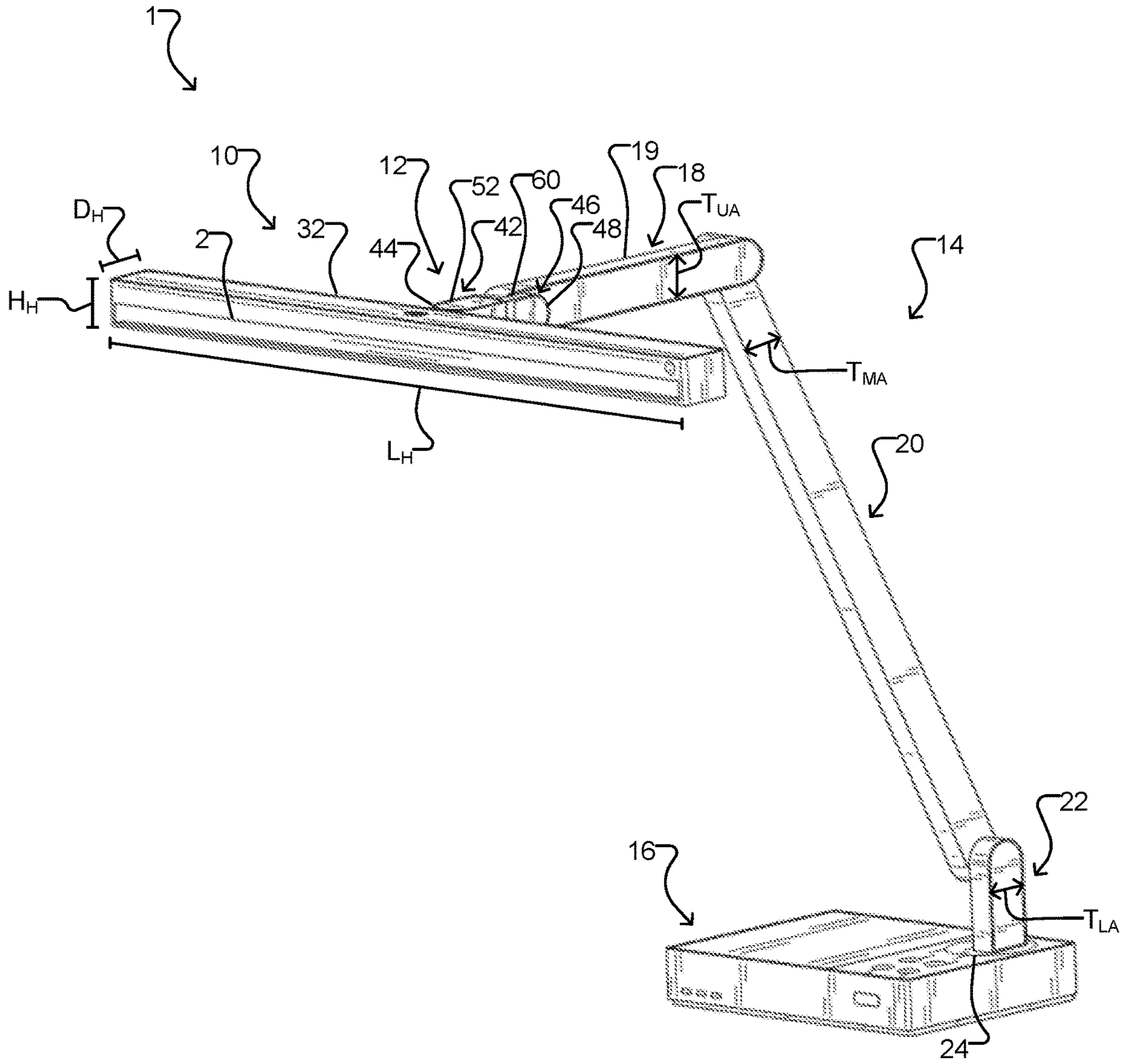
FIG. 1 is a perspective view of a lamp according to an embodiment, with the lamp in an extended configuration.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The term "proximal" as used herein refers to a direction generally toward the base of the lamp. The term "distal" is used herein refers to a direction generally toward the head of the lamp.

FIGS. 1 to 12 show a foldable lamp 1 according to an embodiment. Lamp 1 generally comprises a head 10, a neck joint 12, an arm assembly 14 and a base 16. These features cooperate to extend and fold in a manner that provides improved functionality and ease of storage, packaging and shipping, as described herein.

Pivotal Connections

Head 10 is elongated and houses at least one light source. Head 10 has a tab 34 extending from a rear face 28 of head 10. Tab 34 protrudes from a rear face 28 of head 10 at an approximate midpoint the length of head 10. Tab 34 has a rounded end 40. Tab 34 may be integrally formed with head 10, or as a separate section easily assembled together with head 10.

Figure 2:
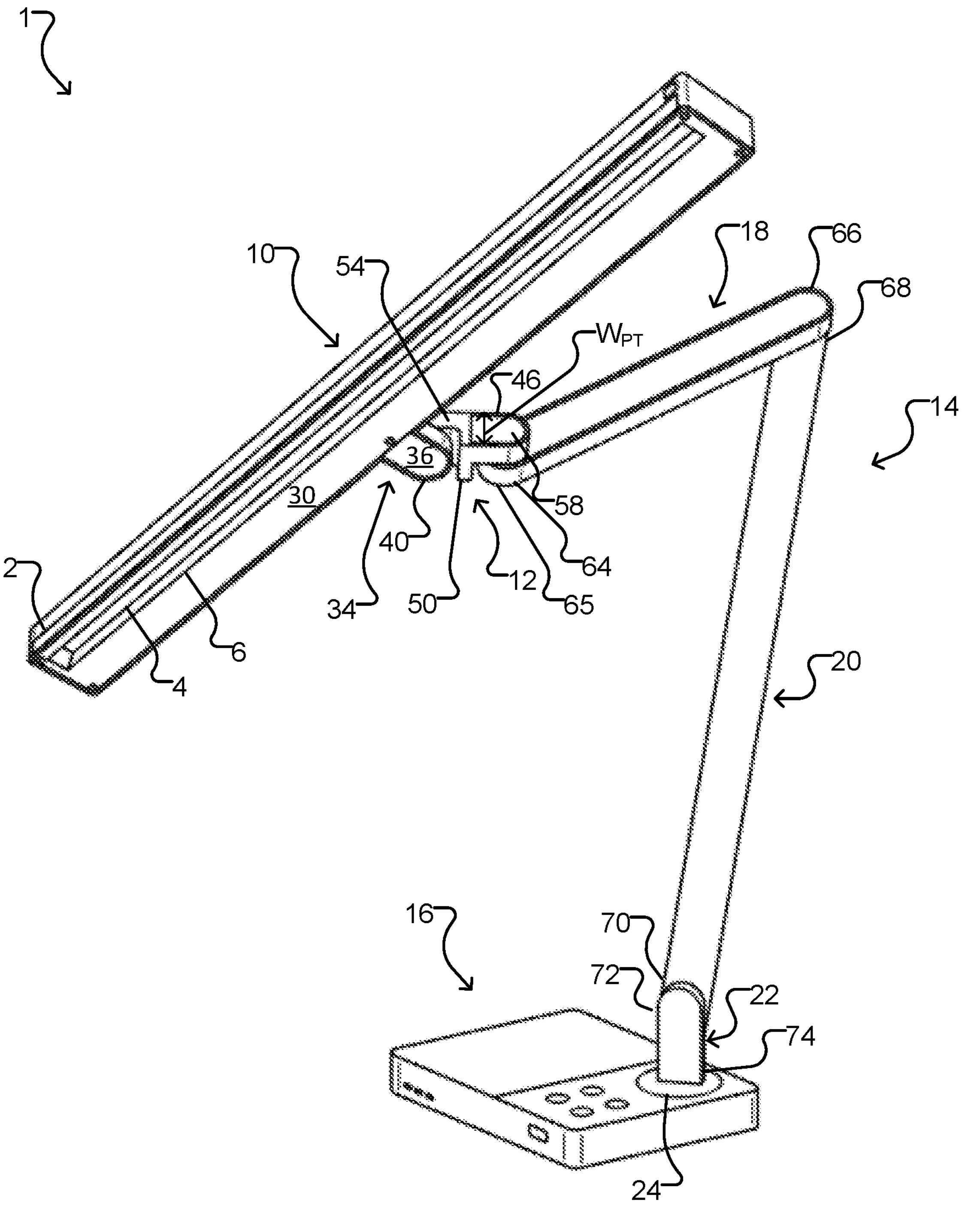
FIG. 2 is a perspective view of the lamp of FIG. 1, with the head and neck of the lamp rotated.

Neck joint 12 includes a distal tab 42 with a rounded end 44, and a proximal tab 46 with a rounded end 48. As best shown in FIG. 2, distal tab 42 and proximal tab 46 extend in their respective directions, rotationally offset by 90 degrees, from a middle wall 50. Distal tab 42, proximal tab 46 and middle wall 50 may be formed as a unitary piece or may be provided in two or more sections which are easily assembled together.

Tab 34 of head 10 is pivotally connected to distal tab 42 of neck joint 12, at inner face of tab 34 and inner face of distal tab 42. Rounded end 44 of distal tab 42 (adjacent rear face 28 of head 10) and rounded end 38 of tab 34 (adjacent middle wall 50) together permit at least 180 degrees of unimpeded pivoting of head 10 about the axis of the pivot connection between distal tab 42 and tab 34.

Arm assembly 14 includes an upper arm 18, mid arm 20 and a lower arm 22. Proximal tab 46 of neck joint 12 is pivotally connected to a distal end 64 of upper arm 18. Rounded end 65 of distal end 64 (adjacent middle wall 50) permits at least 180 degrees of unimpeded pivoting of neck joint 12 about the axis of the pivot connection between neck joint 12 and upper arm 18.

Proximal end 66 of upper arm 18 is pivotally connected to distal end 68 of mid arm 20. Proximal end 70 of mid arm 20 is pivotally connected to distal end 72 of lower arm 22. Proximal end 74 of lower arm 22 is fixedly connected to swivel base 24. Swivel base 24 is embedded in and rotatably connected to base 16.

Alignment of Head and Arm Assembly Features

Certain dimensions of certain features of lamp 1 are aligned for aesthetic and functional advantage in various configurations.

Figure 3:
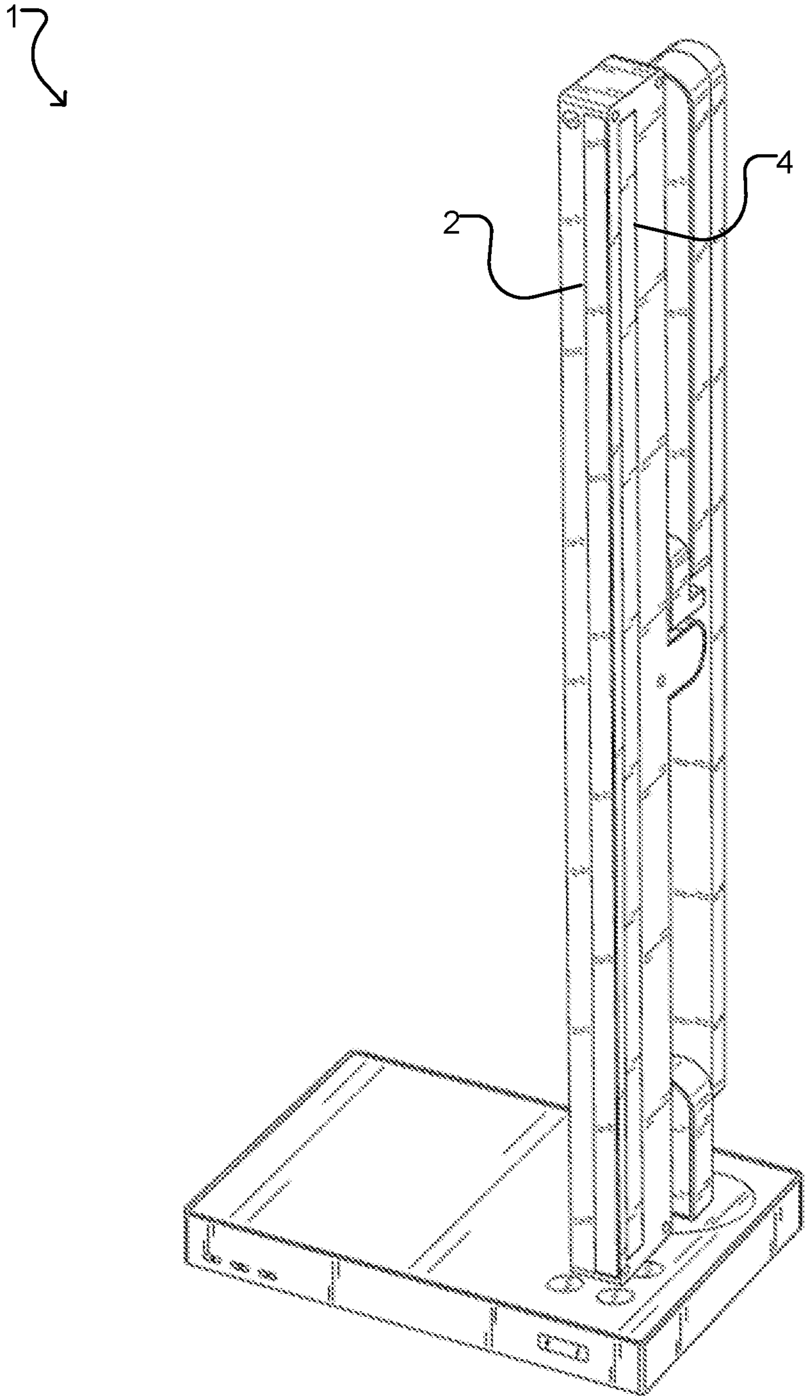
FIG. 3 is a perspective view of the lamp of FIG. 1, with the lamp in a folded configuration.
Figure 4:
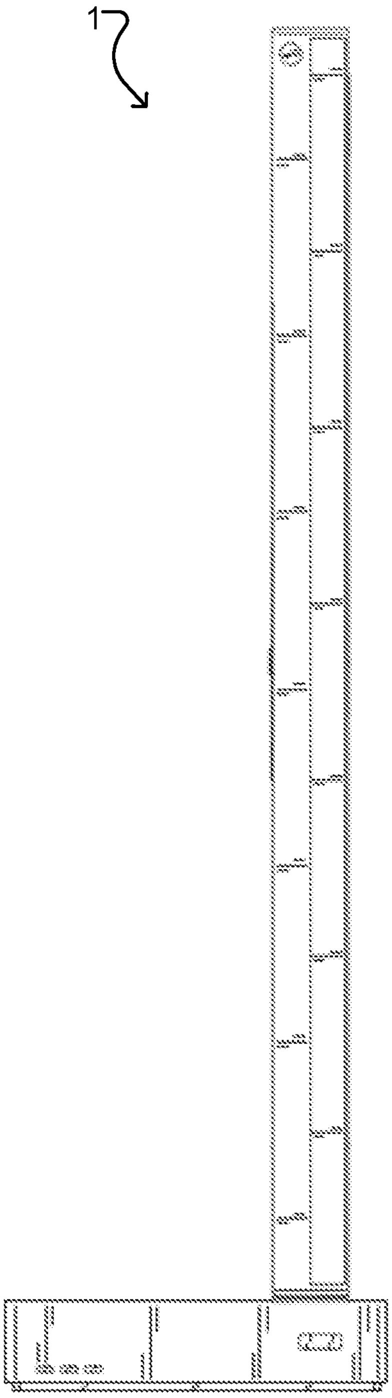
FIG. 4 is a front elevation view of the lamp of FIG. 1, with the lamp in a folded configuration.
Figure 5:
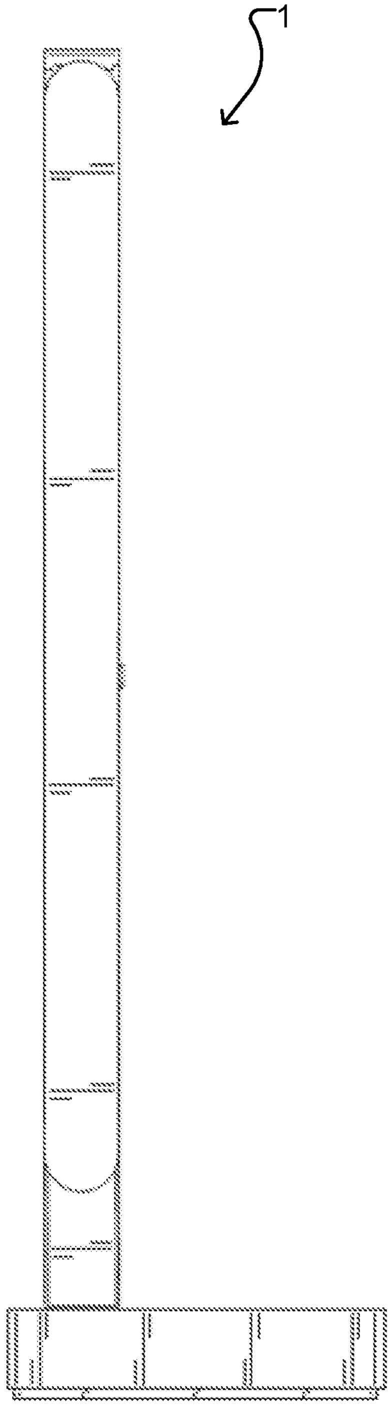
FIG. 5 is a rear elevation view of the lamp of FIG. 1, with the lamp in a folded configuration.
Figure 6:
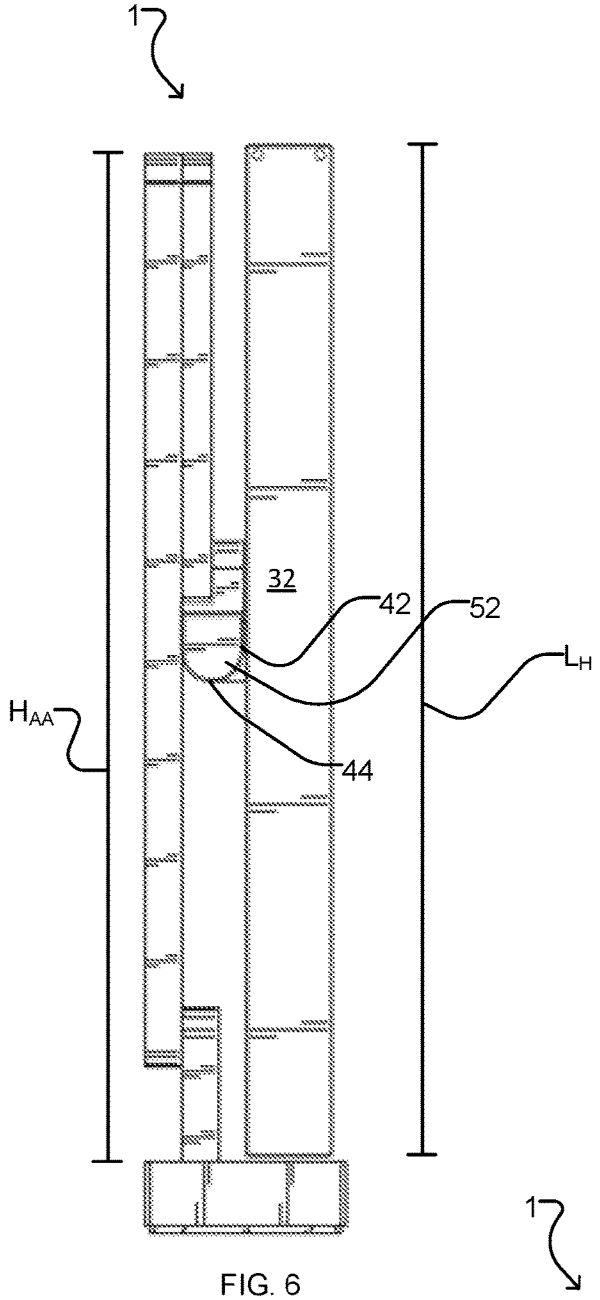
FIG. 6 is a left side elevation view of the lamp of FIG. 1, with the lamp in a folded configuration.

As best shown in FIGS. 3 to 5, the following dimensions may be substantially equal: (i) height $H_H$ of head 10; (ii) combined thickness of tab 34 and distal tab 42; (iii) width $W_{PT}$ of proximal tab 46; (iv) thickness $T_{UA}$ of upper arm 18; (v) thickness $T_{MA}$ of mid arm 20; and (vi) thickness $T_{LA}$ of lower arm 22. As best shown in FIG. 6, the length $L_H$ of head 10 may be substantially equal to the height $A_{AH}$ of folded arm assembly 14. In certain configuration such as the extended configuration shown in FIG. 1, the folded configuration shown in FIGS. 3 to 8, and the partially extended configuration in FIG. 10, the foregoing alignment of dimensions provides a desirable sleek aesthetic. For example, outer face 52 of distal tab 42 is flush with a top face 32 of head 10 and with top face 19 of upper arm 18 in the configurations shown in FIGS. 1, 6 and 10. Similarly, bottom face (not shown) of proximal tab 42 is flush with bottom face 30 of head 10 and with bottom face 21 of upper arm 18 in the configurations shown in FIGS. 1, 6 and 10. Also, neck joint 12 is shaped such that outer face 52 of distal tab 42 is flush with a top face 60 of proximal tab 46, and outer face 58 of proximal tab 46 is flush with a side face 54 of distal tab 42, to provide added streamlining of features. Importantly, in the folded configuration shown in FIGS. 3 to 8, the foregoing alignment of dimensions cooperate to provide compactness for ease of storage, packaging and shipping.

Figure 7:
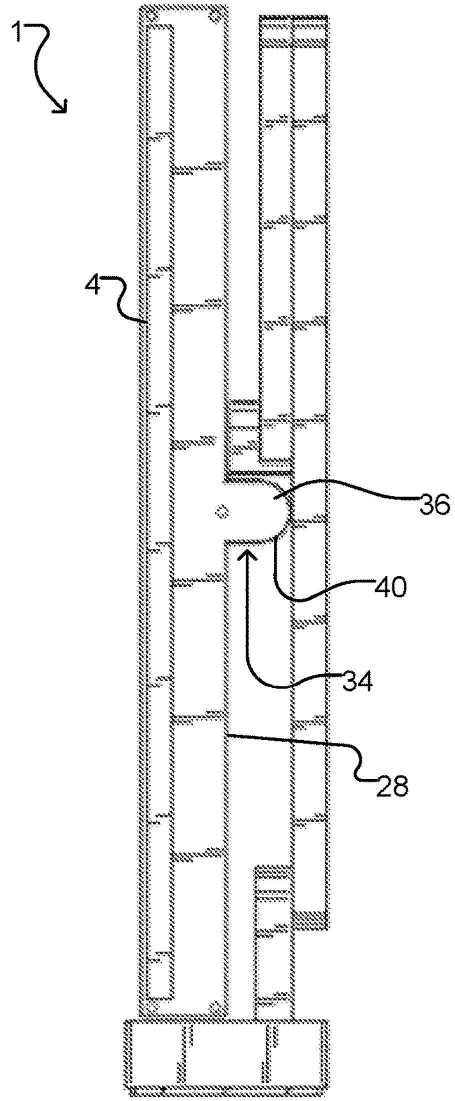
FIG. 7 is a right side elevation view of the lamp of FIG. 1, with the lamp in a folded configuration.

As best shown in FIGS. 6 and 7, the dimensions of overlapping and pivotally connected tab 34 and distal tab 42 are substantially similar, minimizing spacing as between head 10 and neck joint 12 for added compactness.

Figure 8:
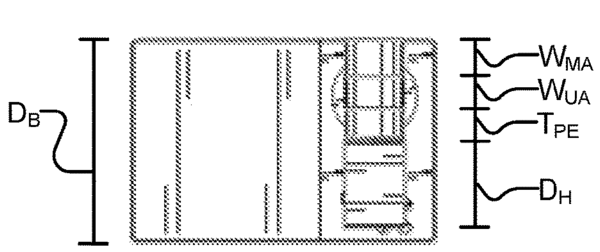
FIG. 8 is a top view of the lamp of FIG. 1, with the lamp in a folded configuration.

As best shown in FIGS. 6 to 8, the depth DB of base 16 is greater than or equal to the combined sum of (i) depth DH of head 10; (ii) thickness $T_{PE}$ of proximal tab 46; (iii) width $W_{UA}$ of upper arm 18; and (iv) width $W_{MA}$ of mid arm 20. In the folded configuration best shown in FIG. 8, the foregoing dimensional constraints ensures head 10 and arm assembly 14, in the folded configuration, stay within the footprint of base 16, again for added compactness.

Configurations

Figure 9:
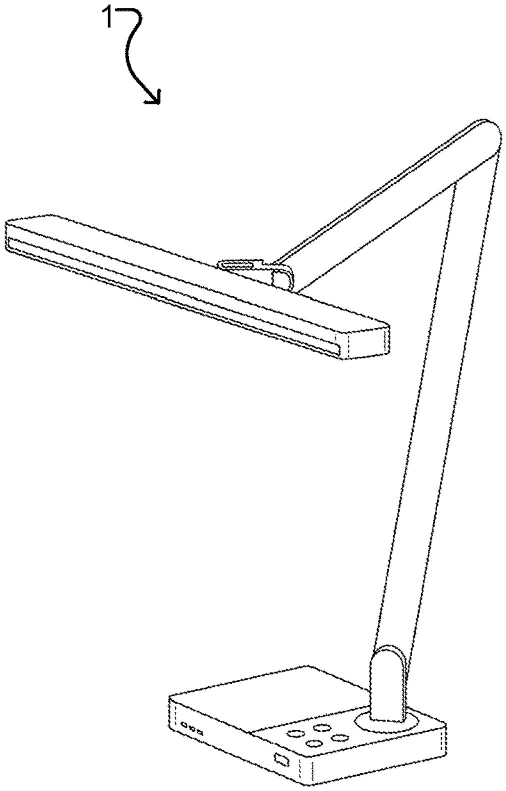
FIG. 9 is a perspective view of the lamp of FIG. 1, with the lamp in an extended configuration.
Figure 10:
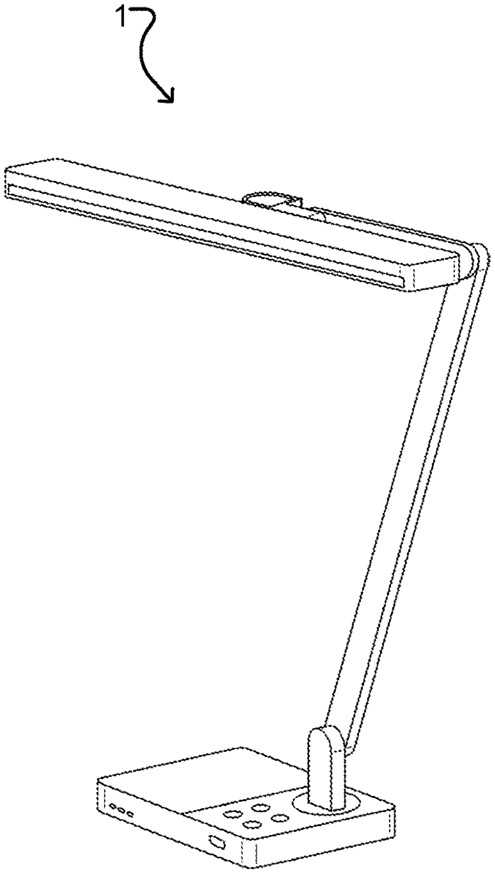
FIG. 10 is a perspective view of the lamp of FIG. 1, with the lamp in a partially extended configuration.

FIG. 1 shows lamp 1 in a forwardly extended configuration, and FIG. 9 shows lamp 1 in a balanced extended configuration; these configurations can be useful, for example, where a computer monitor or laptop computer is placed in front of base 16, and head 10 is above and illuminating the screen, keyboard and/or task space. FIG. 10 shows lamp in a more compact, partially folded configuration; this configuration can be useful, for example, where the extension provided by upper arm 18 is unnecessary or undesirable. FIGS. 3 to 8 show lamp 1 in a folded configuration; in addition to compactness for storage, packaging and shipping, this folded configuration can be used for ambient lighting of a room. Light can be directed 360 degrees in a horizontal direction by swiveling head 10/arm assembly 14 on swivel base 24.

Base Functions

Base 16 may include one or more inductive chargers, electrical outlets, and communication ports. Communication ports can include one or more of USB (type A, B, C), micro USB, HDMI, Lightning, DVI, VGA, and DisplayPort connections. Base 16 may additionally or alternatively include suitable controls for lamp 1's light source(s).

Bi-Directional Lighting

Figure 11:
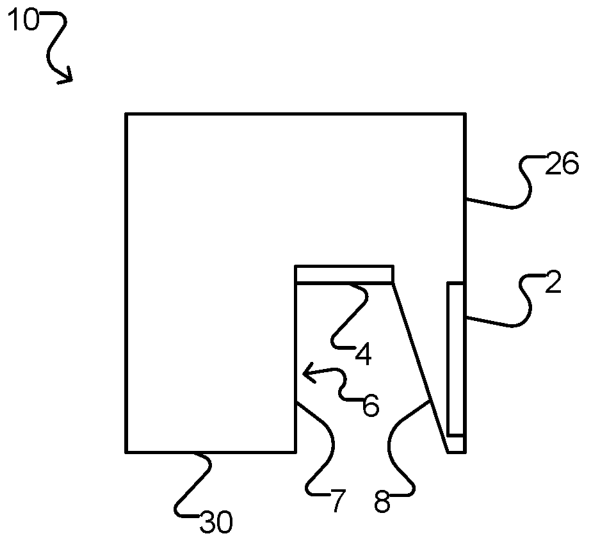
FIG. 11 is a vertical cross-sectional view of the head of the lamp of FIG. 1.
Figure 12:
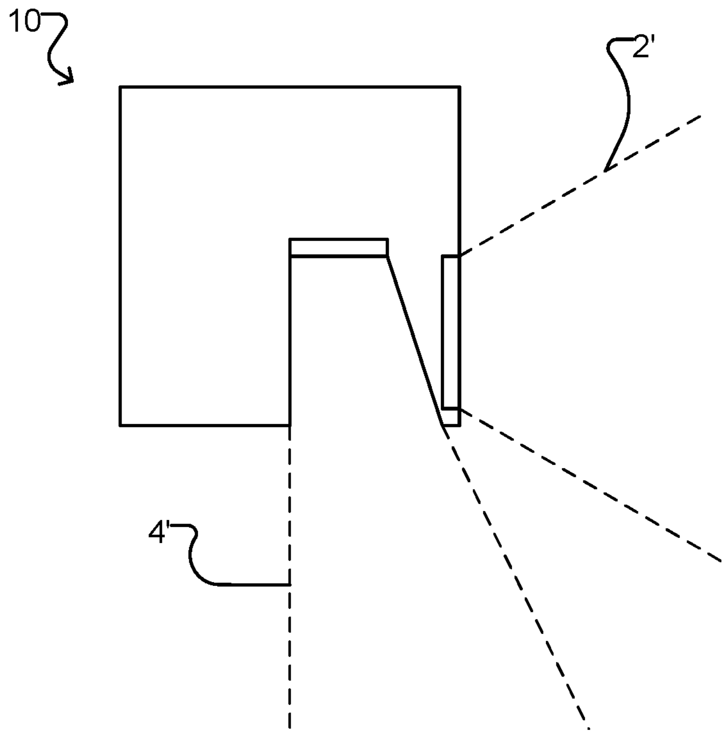
FIG. 12 is a vertical cross-sectional view of the head of the lamp of FIG. 1, showing the beam spread from two light sources.

As shown in FIG. 11, head 10 provides bi-directional light with two sources of light, each facing directions perpendicular with respect to the other. For example, first light source 2 may be on front face 26 of head 10, and a second light source 4 may be on bottom face 30 of head 10. Light source 2 and light source 4 may be independently operable by dedicated controls for example on head 10 and/or base 16.

Light source 2 can be directed forward to illuminate the user for purposes such as videoconferencing, live streaming and make-up applications. Light source 2 can, for example, provide diffuse light. Light source 2 provides symmetric beam spread 2'.

Light source 4 can be directed downwards for task-oriented work. Light source 4 may be recessed in bottom face 30. Inner walls 6 around the perimeter of light source 4 function as baffles to provide an asymmetric beam spread, for example to prevent or minimize light directed to a screen below head 10, in order to reduce glare. Rear inner wall 7 is closer to the vertical than front inner wall 8, to provide asymmetric beam spread 4'. For example, rear inner wall 7 may be vertical or tapers out from the vertical no greater than 5 degrees off the vertical, whereas front inner wall 8 tapers out from the vertical by at least 10 or at least 15 degrees. Head 10 may for example be positioned at eye level of the user to hide light source 4 from the user's eyes.

In some embodiments head 10 can be pivoted upward, for example at the pivot connection between neck joint 12 and upper arm 18 and/or the pivot connection between upper arm 18 and mid arm 20, so that light source 2 provides up-lighting or ambient lighting of a room, and light source 4 provides the forward direction illumination.

Light sources 2 and 4 may be for example be point sources of light, such as arrays of light emitting diodes (LEDs). The LEDs may be arrayed on elongated LED boards substantially equal, or slightly under, in length to length $L_H$ of head 10. The LEDs may be fully tunable white with the ability to adjust correlated color temperature (CCT) white points, or fully tunable red, green, blue and white (RGBW) color, and be made to change color together or independent of one another.

While a number of exemplary aspects and embodiments have been discussed above, those of skill in the art will recognize certain modifications, permutations, additions and sub-combinations thereof. For example:

- The head and neck joint may be connected in alternative ways. In some embodiments the tab of the head may be on top, and the distal tab of the neck joint on the bottom.
- Light sources are shown in the drawings as single strips but alternatively may be shorter strips in series, narrower strips in parallel, and the like.
- The arm assembly may be constructed in alternative ways. In some embodiments the lower arm may be absent, with the mid arm fixedly attached to the swivel base instead.
- The neck portion may not have a middle wall, i.e., the proximal tab and distal tab may be directly connected to each other.
- The two light sources may be a single light source that is adjustable between two orientations perpendicular with respect to each other.
- Bi-directional light may be provided on lamps other than that specifically described herein. The lamp may be a foldable or non-foldable lamp. Instead of a lamp with a base, the head may be provided on an arm assembly or the like that clips onto a monitor.

It is therefore intended that the following appended claims and claims hereafter introduced are interpreted to include all such modifications, permutations, additions and sub-combinations as are consistent with the broadest interpretation of the specification as a whole.

The invention claimed is:

1. A lamp comprising:

a body; and a head connected to the body, the head comprising a first light source and a second light source;

wherein the first light source and the second light source are configured to provide light in directions perpendicular from each other;

wherein the first light source is mounted in a laterally elongated manner on a front face of the head and the second light source is mounted in a laterally elongated manner on a bottom face of the head, and wherein the second light source is recessed in the bottom face of the head in a recess that is partially defined by a rear inner wall that is vertical and a front inner wall that tapers outward from the vertical, such that the second light source provides an asymmetric, downward beam spread;

wherein the first light source and the second light source are independently operable; and wherein the body further comprises an arm assembly connected to the head and a base connected to the arm assembly.

2. The lamp according to claim 1 wherein the first light source and the second light source each comprise an elongated LED board.

3. The lamp according to claim 2 wherein the length of the LED board is substantially equal to, or slightly under, the length of the head.

4. The lamp according to claim 3 wherein the LED board is a fully tunable white or fully tunable red, green, blue, and white (RGBW) color.

5. The lamp according to claim 1 wherein the arm assembly is foldable.

6. The lamp according to claim 5 wherein the arm assembly includes an upper arm, a mid arm, and a lower arm.

7. The lamp according to claim 6 wherein the arm assembly connects to a rear face of the head opposite from the first light source.

8. The lamp according to claim 7 wherein the head is swivelly connected to the arm assembly.

9. The lamp according to claim 8 wherein the arm assembly is swivelly connected to the base.

10. The lamp according to claim 1 wherein the rear inner wall varies from the vertical by no greater than about 5 degrees, and the front inner wall tapers outwardly from the vertical by about 10 degrees to about 15 degrees.

* * * * *